United States Patent [19]
Kushiro et al.

[11] Patent Number: 5,539,593
[45] Date of Patent: Jul. 23, 1996

[54] CASSETTE LOADING MECHANISM HAVING A CONFIGURATION TO PROTECT THE HEAD DRUM

[75] Inventors: Sunao Kushiro, Chiba; Hiromitsu Baba, Kanagawa, both of Japan

[73] Assignee: Sony Corporation, Tokyo, Japan

[21] Appl. No.: 182,554

[22] Filed: Jan. 19, 1994

[30] Foreign Application Priority Data

Jan. 26, 1993 [JP] Japan .................................. 5-010347

[51] Int. Cl.⁶ .................................................. G11B 15/60
[52] U.S. Cl. ............................................. 360/85; 360/137
[58] Field of Search ........................... 360/85, 95, 137, 360/84, 96.5

[56] References Cited

U.S. PATENT DOCUMENTS

| | | | |
|---|---|---|---|
| 4,616,274 | 10/1986 | Nagaoka | 360/85 |
| 4,807,077 | 2/1989 | Zaitsu et al. | 360/85 |
| 4,809,115 | 2/1989 | Shibata et al. | 360/137 |
| 5,025,332 | 6/1991 | Tsuchida et al. | 360/95 |
| 5,134,252 | 7/1992 | Himeno et al. | 360/107 |
| 5,195,001 | 3/1993 | Murakami et al. | 360/85 |
| 5,291,349 | 3/1994 | Yamaguchi | 360/96.5 |

FOREIGN PATENT DOCUMENTS

| | | | |
|---|---|---|---|
| 0206944 | 8/1988 | Japan | 360/85 |
| 0378152 | 4/1991 | Japan | 360/85 |

*Primary Examiner*—Stuart S. Levy
*Assistant Examiner*—Brian E. Miller
*Attorney, Agent, or Firm*—Jay H. Maioli

[57] ABSTRACT

A cassette loading mechanism in a recording and/or reproducing apparatus, including a stationary chassis supporting a rotary head drum thereon, and a movable chassis disposed movably with respect to the stationary chassis and supporting a tape cassette. The movable chassis has an unloading position where a magnetic tape is unloaded from the rotary head drum, and a loading position where the magnetic tape is loaded on the rotary head drum. The movable chassis is formed with a recessed portion which receives the rotary head drum when the movable chassis is in the loading position. The recessed portion is bridged by a reinforcing arm to which a flexible circuit board is secured. The reinforcing arm is electrically connected with photosensors for detecting the magnetic tape cassette when the movable chassis shifts into the loading position.

10 Claims, 4 Drawing Sheets

5,539,593

CASSETTE LOADING MECHANISM HAVING A CONFIGURATION TO PROTECT THE HEAD DRUM

BACKGROUND OF THE INVENTION

The present invention relates to a cassette loading mechanism for loading a tape cassette in a recording and/or reproducing apparatus.

U.S. Pat. No. 4,870,517 discloses a cassette loading mechanism utilized in a recording and/or reproducing apparatus, which includes a stationary chassis and a sliding chassis slidable relative to the stationary chassis and shiftable between an eject position where a magnetic tape cassette is inserted into or removed from the apparatus, and a loaded position where the magnetic tape cassette is completely loaded.

Generally, a sliding or movable chassis used in such a cassette loading mechanism is formed with a recess. The recess receives a rotary head drum supported on the stationary chassis when the movable chassis is in the loading position. The provision of the recess serves for preventing contact of the movable chassis with the rotary head drum in the loading position of the movable chassis.

In addition, the conventional cassette loading mechanism includes sensors for detecting the magnetic tape when the movable chassis is in the loading position. The sensors are arranged around the recess on the movable chassis are connected with wire.

There is a demand to provide improved cassette loading mechanism having an enhanced rigidity of a peripheral portion around the recess of the movable chassis, and saving a mounting space of the wire for the sensors within the mechanism.

SUMMARY OF THE INVENTION

An object of the present invention is to provide a cassette loading mechanism utilized in a recording and/or reproducing apparatus, which has a movable chassis with improved mechanical strength and which saves mounting space of wire used for tape detecting sensors.

According to one aspect of the present invention, there is provided a cassette loading mechanism in a recording and/or reproducing apparatus for a magnetic tape cassette, comprising:

a first chassis;

a rotary head drum supported on the first chassis;

a plurality of tape guides supported on the first chassis;

a second chassis opposed to the first chassis and movable relative to the first chassis;

a pair of reel hubs supported on the second chassis; and an arm member supported on the second chassis and arranged so as to prevent contact of the second chassis with the rotary head drum and the plurality of tape guides during motion of the second chassis.

According to another aspect of the present invention, there is provided in a recording and/or reproducing apparatus including tape guides for loading a magnetic tape stored in a magnetic tape cassette.

a first chassis;

a rotary head drum supported on the first chassis;

a plurality of tape guides supported on the first chassis for transporting the tape to the rotary head drum;

a second chassis opposed to the first chassis and movable relative to the first chassis;

a pair of reel hubs supported on the second chassis for rotating the tape about the rotary head drum; and an arm member supported on the second chassis and so arranged as to prevent contact of the second chassis with the rotary head drum and the plurality of tape guides during motion of the second chassis.

According to still another aspect of the present invention, there is provided a cassette loading mechanism used in a recording and/or reproducing apparatus for loading a tape cassette which stores a magnetic tape, comprising:

a stationary chassis supporting a rotary head drum thereon;

a movable chassis disposed movably with respect to the stationary chassis and supporting the tape cassette, the movable chassis having an unloading position where the magnetic tape is unloaded to the rotary head drum, and a loading position where the magnetic tape is loaded to the rotary head drum;

the movable chassis being formed with a recessed portion in which the rotary head drum is received when the movable chassis is in the loading position;

means for reinforcing the recessed portion;

sensor means for detecting the magnetic tape cassette when the movable chassis shifts into the loading position; and a flexible circuit board secured to the reinforcing means and electrically connected with the sensor means.

DESCRIPTION OF THE PREFERRED EMBODIMENT

Figure 1:
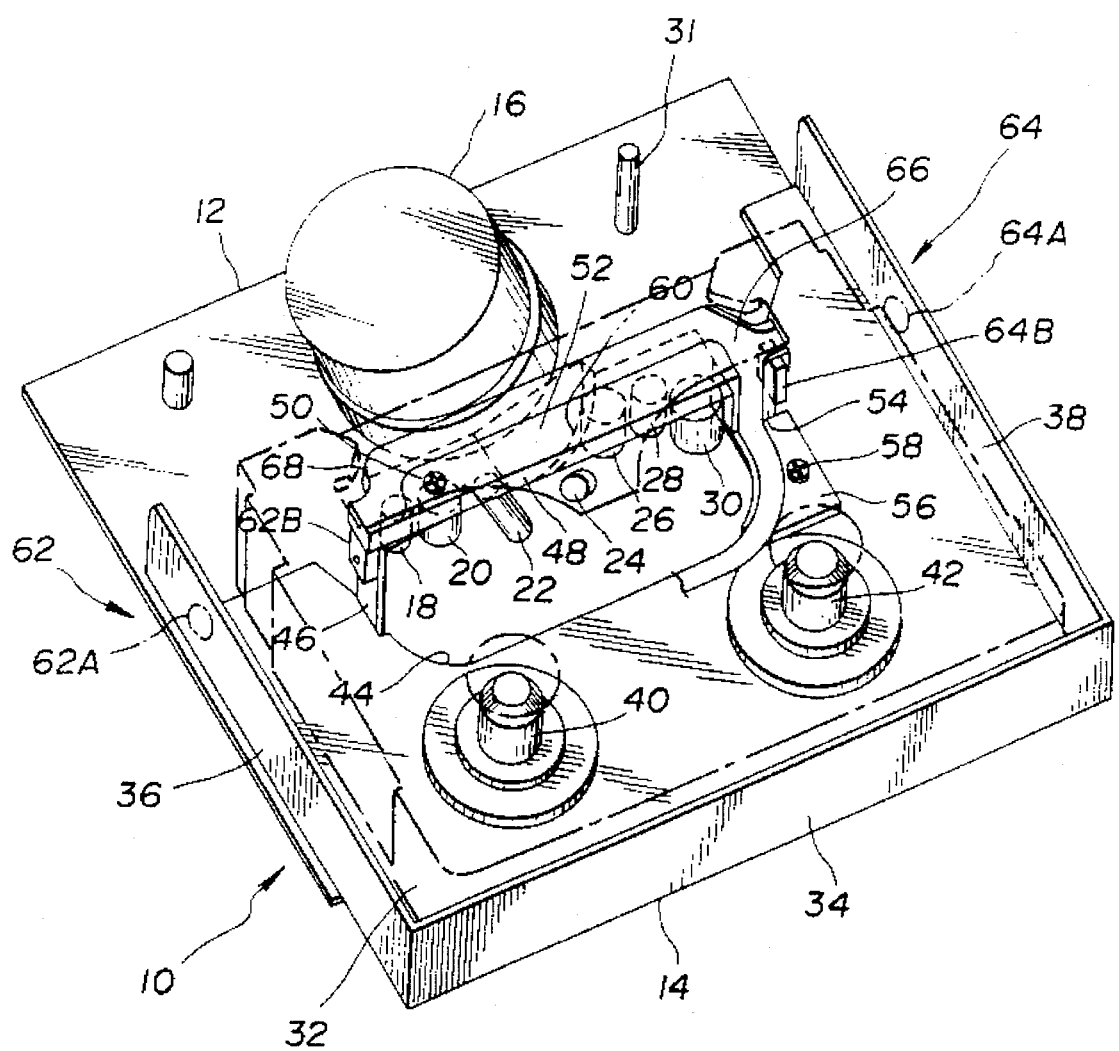
FIG. 1 is a perspective view of a preferred embodiment of a cassette loading mechanism according to the present invention, showing a movable chassis in an unloading position.
Figure 2:
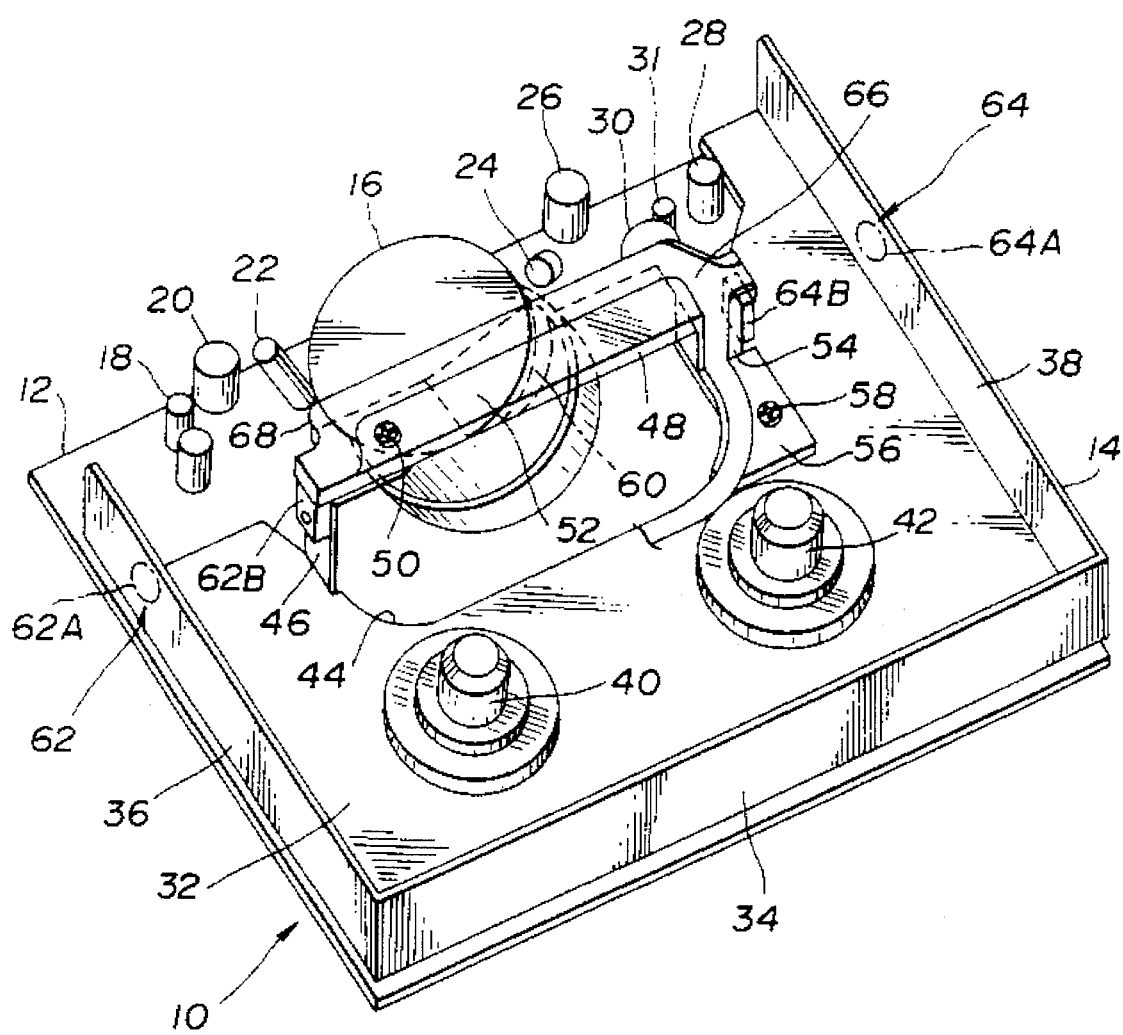
FIG. 2 is a view similar to FIG. 1, showing the movable chassis in a loading position.
Figure 4:
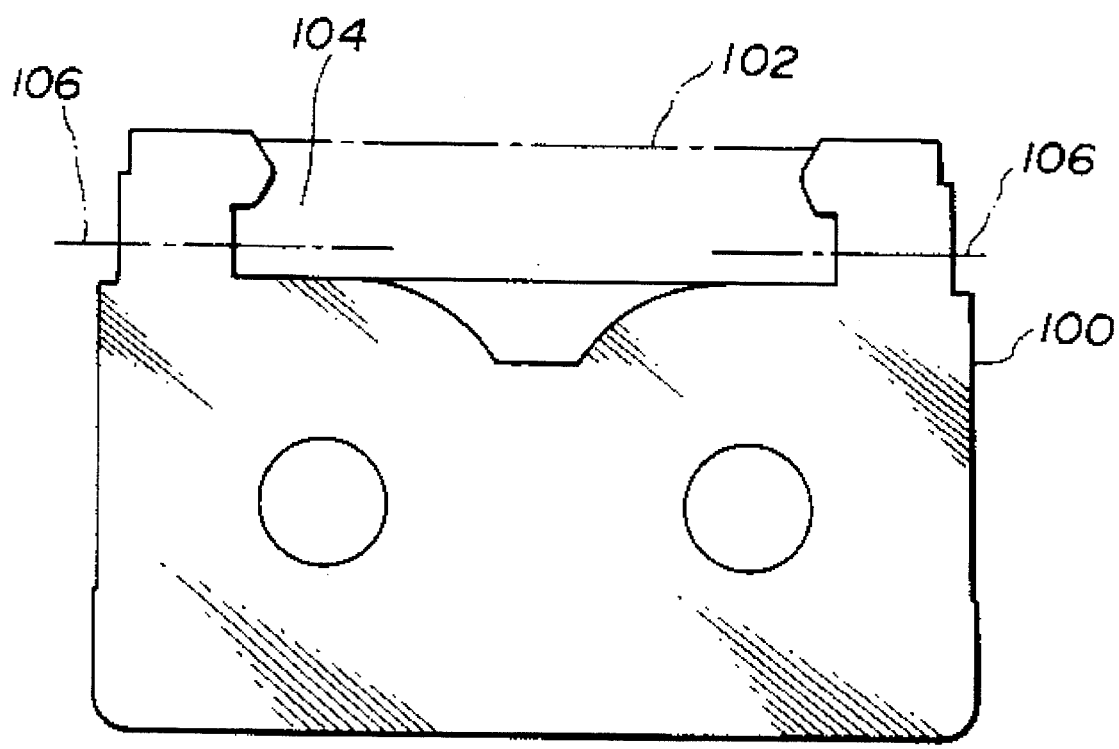
FIG. 4 is a plan view of a magnetic tape cassette which is loaded by the mechanism.

Referring now to FIGS. 1 and 2, and FIG. 4, there are respectively shown a cassette loading mechanism 10 according to the present invention, and a tape cassette 100 storing a magnetic tape 102.

As shown in FIG. 1, the cassette loading mechanism 10 includes a rectangular stationary chassis 12 and a movable chassis 14 movably disposed with respect to the stationary chassis 12. A rotary head drum 16 is rotatably supported at a rear portion of the stationary chassis 12 in tilting relation to the stationary chassis 12.

Disposed spaced forwardly from the rotary head drum 16 are tape guides 18, 20, 22, 24, 26 and 28 and a pinch roller 30 as seen in FIG. 1. The tape guides 18, 20, 22, 24, 26 and 28 and the pinch roller 30 are so constructed as to be driven by a driving device (not shown) shiftably between two positions as shown in FIGS. 1 and 2. Namely, the tape guides 18–28 and the pinch roller 30 are movable between the middle portion of the stationary chassis 12 as seen in FIG. 1 and the rear end portion thereof as seen in FIG. 2. A capstan 31 is disposed spaced rightward as viewed in FIG. 1, apart from the rotary head drum 16.

As best shown in FIG. 1, the movable chassis 14 includes a bottom wall 32, a front wall 34 and two opposed side walls 36 and 38 which are connected with the bottom wall 32. Rotatably supported on the bottom wall 32 are a supply reel hub 40 and a take-up reel hub 42 for mounting supply and take-up reels of the tape cassette 100, respectively. The movable chassis 14 has an unloading position as shown in FIG. 1, where the magnetic tape 102 is unloaded from the rotary head drum 16, and a loading position as shown in FIG. 2, where the magnetic tape 102 is loaded on the rotary head drum 16.

A generally U-shaped recessed portion 44 is formed on a rear portion of the bottom wall 32 in opposed relation to the rotary head drum 16. As seen in FIGS. 1 and 2, the bottom wall 32 is formed with a reverse L-shaped integral support 46 which includes a vertical portion extending vertically from a peripheral edge of the recessed portion 44 and a lateral portion extending laterally from an upper end of the vertical portion. Secured to the lateral portion of the support 46 is one end portion of a reinforcing arm 48 by means of a screw 50.

As shown in FIGS. 1 and 2, the reinforcing arm 48 is of a generally L shape in section and is made of a synthetic resin material. The reinforcing arm 48 includes a horizontal body section 52 extending over the recessed portion 44, a vertical leg section 54 extending vertically downwardly as viewed in FIGS. 1 and 2, from the body section 52, and a base section 56 extending horizontally from a lower end of the leg section 54. The reinforcing arm 48 is fixedly connected at the base section 56 to the movable chassis 14 by means of a screw 58. Thus, the reinforcing arm 48 cooperates with the integral support 46 of the movable chassis 14 to form a bridge spanning opposed edges of the recessed portion 44 as seen in FIGS. 1 and 2. The integral support 46 acts as the other leg section of the reinforcing arm 48 opposed to the leg section 54. The provision of the bridge structure serves for enhancing a rigidity in the recessed portion 44 of the movable chassis 14.

The horizontal body section 52 is formed, on its underside surface, with a generally sectoral groove 60 as indicated in a phantom line of FIGS. 1 and 2. The sectoral groove 60 is so designed as to receive an upper corner portion of the tilting rotary head drum 16 when the movable chassis 14 is in the loading position as seen in FIG. 2. In this position as shown in FIG. 2, the recessed portion 44 also receives a lower portion of the rotary head drum 16 together with the tape guides 18, 20, 22, 24, 26 and 28 and the pinch roller 30 which are driven to the rear end portion of the stationary chassis 12.

As seen in FIGS. 1 and 2, there are provided photosensor units 62 and 64 for detecting the magnetic tape cassette 100 as shown in FIG. 4. The photosensor unit 62 includes a light source 62A fixed on the side wall 36 of the movable chassis 14 and a photo-sensitive member 62B secured to a vertical portion of the integral support 46. Similarly, the photosensor unit 64 includes a light source 64A secured to the side wall 38 of the movable chassis 14 and a photo-sensitive member 64B secured to the vertical leg section 54 of the reinforcing arm 48. Two pairs of the light source and photosensitive member 62A, 62B and 64A, 64B are disposed in opposed relation so that the photo-sensitive members 62B and 64B detect lights emitted from the light sources 62A and 64A, respectively. The photosensors 62 and 64 are so arranged as to be disposed on one straight line extending therebetween.

Light paths are formed between respective pairs of the light source and photo-sensitive member 62A, 62B and 64A, 64B. The light paths as indicated at 106 in FIG. 4, are disposed in an opening 104 of the tape cassette 100 as shown in FIG. 4. As is generally known, the opening 104 is usually closed with a lid (not shown) when the movable chassis 14 carrying the tape cassette 100 is located in the unloading position, and exposed when the movable chassis 14 carrying the tape cassette 100 is moved to the loading position. In the loading position of the tape cassette 100, the magnetic tape 102 is exposed through the opening 104.

The photosensor units 62 and 64 are electrically connected to a flexible circuit board 66 attached to an upper surface of the reinforcing arm 48. The flexible circuit board 66 extends from left to right ends, as viewed in FIG. 1, of the horizontal body section 52 of the reinforcing arm 48 along a Fear extension 68 thereof which projects rearwardly. The rear extension 68 has a lateral width which is larger than those of the integral support 46 and the leg section 54, so as to form a mounting space for the flexible circuit board 66 thereon. The flexible circuit board 66 then extends along the vertical leg section 54 and base section 56 of the reinforcing arm 48, and the peripheral edge of the recessed portion 44. The flexible circuit board 66 is received in the opening 104 of the tape cassette 100 together with the reinforcing arm 48 and the photosensitive members 62B and 64B, when the movable chassis 14 is in the loading position as seen in FIG. 2. This arrangement of the flexible circuit board 66 serves for saving a mounting space of the flexible circuit board 66 on the movable chassis 14.

Figure 3:
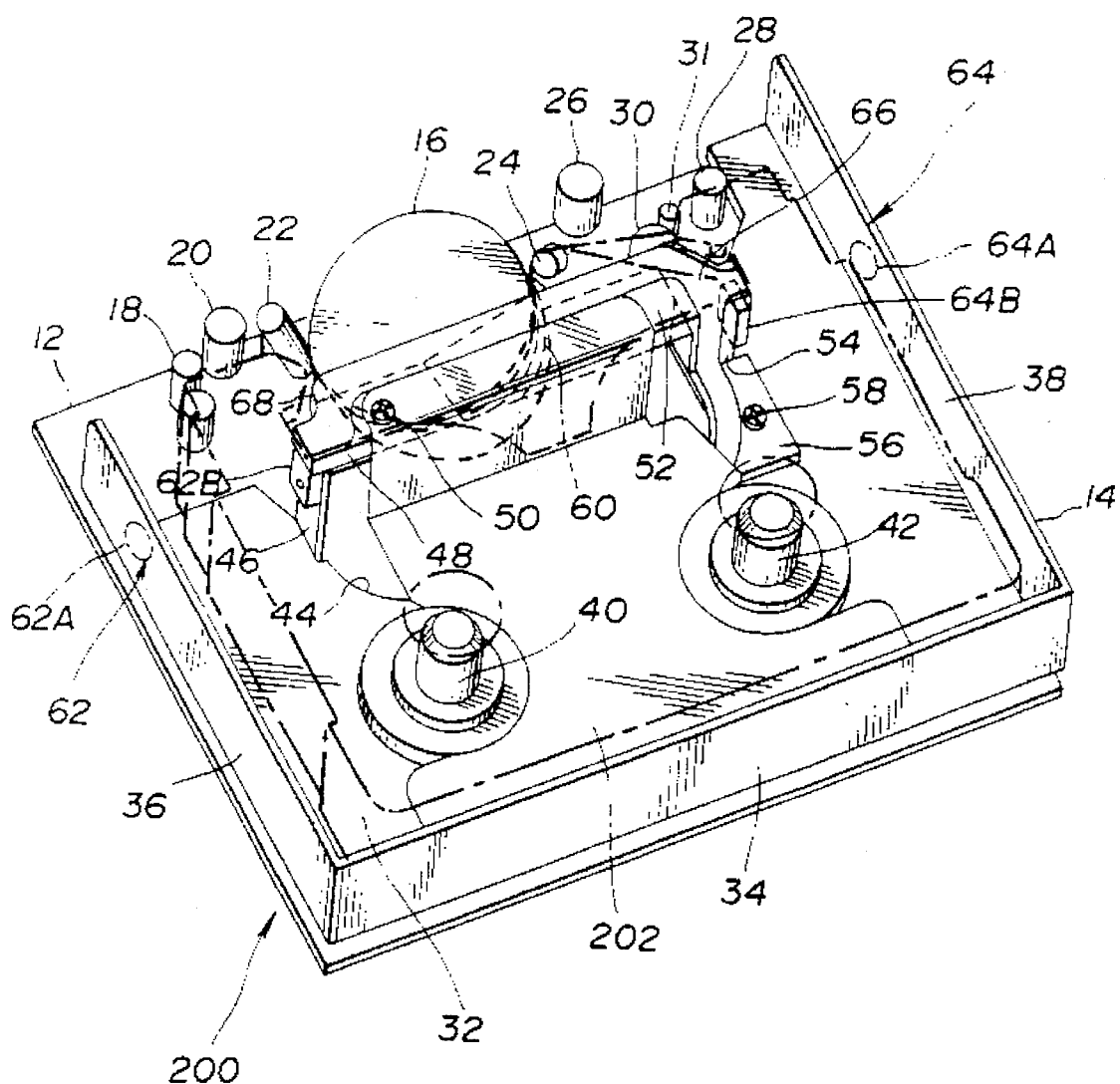
FIG. 3 is a perspective view of another preferred embodiment of the cassette loading mechanism.

Referring to FIG. 3, there is shown another embodiment of the cassette loading mechanism 200 of the present invention, in which like numerals denote like parts of the first embodiment and therefore the detailed descriptions thereof are omitted. As shown in FIG. 3, a protector plate 202 made of metal or synthetic resin material is fixedly connected at one end thereof with the horizontal body section 52 of the reinforcing arm 48 by means of the screw 50, together with the integral support 46 of the movable chassis 14. The protector plate 202 extends vertically downwardly and then horizontally forwardly on the bottom wall 32 of the movable chassis 14 as seen in FIG. 3. Thus, the protector plate 202 substantially covers the recessed portion 44 of the movable chassis 14 to prevent the rotary head drum 16, the tape guides 18, 20, 22, 24, 26 and 28 and the pinch roller 30 from suffering from any damage caused by entry of foreign substance.

What is claimed is:

1. A cassette loading mechanism in a recording and/or reproducing apparatus for a magnetic tape cassette, comprising:

a first chassis;

a rotary head drum supported on said first chassis in a tilted orientation toward said first chassis;

a plurality of tape guides supported on said first chassis;

a second chassis opposed to said first chassis and movable relative to said first chassis, said second chassis having a recess to accommodate said rotary head drum when said mechanism is in a tape loading position;

a pair of reel hubs supported on said second chassis;

an L-shaped arm member supported on said second chassis, on one end by a vertical leg portion thereof and on another end by a vertical support integrally formed with said second chassis, arranged so as to prevent contact of said second chassis with said rotary head drum and said plurality of tape guides during motion of said second chassis and including a groove formed in said arm member which receives a portion of said rotary head drum when said second chassis moves to a position closest to said first chassis, said arm member enhancing rigidity of said recess of said second chassis being disposed over said rotary head drum and said tape guides when said mechanism is in said tape loading position;

a pair of opposed sensor means mounted on said second chassis for detecting a magnetic tape cassette and including cable mounted on said arm member and connected to said pair of sensor means, wherein when said mechanism is in the tape loading position, said vertical leg portion and said vertical support are vertically disposed on a straight line drawn between said pair of sensor means, with each of said pair of sensor means comprising a first sensor portion and a second sensor portion, said first sensor portion being mounted on a sidewall of said second chassis and said second sensor portion being mounted on said leg portion and said vertical support of said arm member, said second sensor portion being opposed to said first sensor portion to cooperate therewith.

2. A cassette loading mechanism as claimed in claim 1, wherein said groove is of a generally sectoral shape.

3. A cassette loading mechanism in a recording and/or reproducing apparatus for a magnetic tape cassette, comprising:

a first chassis;

a rotary head drum supported on said first chassis;

a plurality of tape guides supported on said first chassis;

a second chassis opposed to said first chassis and movable relative to said first chassis, said second chassis having a recess formed in a bottom wall thereof to accommodate said rotary head drum when said mechanism is in a tale loading position;

a paid of reel hubs supported on said second chassis;

an L-shaped arm member fixed on said second chassis on one end by a vertical leg portion thereof and on another end by a vertical support integrally formed with said second chassis, said L-shaped arm member being arranged so as to prevent contact of said second chassis with said rotary head drum and said plurality of tape guides during motion of said second chassis, said arm member being disposed over said rotary head drum and said tape guides when said cassette loading mechanism is in the tape loading position, said arm member including a body portion connected to said leg portion and said vertical support and having a width which is larger than a corresponding width of said leg portion and said vertical support, and said arm member enhancing rigidity of said recess of said second chassis;

a pair of opposed sensor means mounted on said second chassis for detecting a magnetic tape cassette, and a cable mounted on said arm member and connected to said pair of sensor means, wherein when said mechanism is in the tape loading position said vertical leg portion and said vertical support are vertically disposed on a straight line drawn between said pair of sensor means;

a protector plate formed of one of a metal or synthetic resin for protecting said rotary head drum and said tape guides, said protector plate having a first end supported on said bottom wall of said second chassis, a second end supported on said arm member, and a vertically extending intermediate portion between said first end and said second end, said second end of said protector plate lying in a plane parallel to said bottom wall of said second chassis and said intermediate portion being substantially perpendicular to said bottom wall of said second chassis.

4. A recording and/or reproducing apparatus including tape guides for loading a magnetic tape stored in a magnetic tape cassette, comprising:

a first chassis;

a rotary head drum supported on said first chassis in a tilted orientation toward said first chassis;

a plurality of tape guides supported on said first chassis for transporting the magnetic tape to said rotary head drum;

a second chassis opposed to said first chassis and movable relative to said first chassis, said second chassis having a recess to accommodate said rotary head drum when said mechanism is in a tape loading position;

a pair of reel hubs supported on said second chassis for moving the magnetic tape around said rotary head drum;

an L-shaped arm member supported on said second chassis on one end by a vertical leg portion thereof and on another end by a vertical support integrally formed with said second chassis, said L-shaped arm member being disposed over said rotary head drum and said tape guides when said mechanism is in the tape loading position, said arm member providing a groove formed in said arm member which receives a portion of said rotary head drum when said second chassis moves to a position closest to said first chassis, said arm member preventing contact of said second chassis with said rotary head drum and said plurality of tape guides during motion of said second chassis, said arm member enhancing rigidity of said recess of said second chassis, and supporting a flexible circuit board; and a pair of opposed sensor means for detecting a magnetic tape cassette, and a cable mounted on said arm member and connected to said pair of sensor means, wherein when said apparatus is in the tape loading position, said vertical leg portion and said vertical support are vertically disposed on a straight line drawn between said pair of sensor means, where each of said pair of sensor means comprises a first sensor portion and a second sensor portion, said first sensor portion being mounted on a sidewall of said second chassis and said second sensor portion being mounted on said leg portion and said vertical support of said arm member, said second sensor portion being opposed to said first sensor portion to cooperate therewith.

5. A recording and/or reproducing apparatus as claimed in claim 4, wherein said groove is of a generally sectoral shape.

6. A recording and/or reproducing apparatus comprising:

a first chassis;

a rotary head drum supported on said first chassis;

a plurality of tape guides supported on said first chassis for transporting the magnetic tape to said rotary head drum;

a second chassis opposed to said first chassis and movable relative to said first chassis, said second chassis having a recess formed in a bottom wall thereof to accommodate said rotary head drum when said mechanism is in a tape loading position;

a pair of reel hubs supported on said second chassis for moving the magnetic tape around said rotary head drum;

a flexible circuit board;

an L-shaped arm member fixed on said second chassis on one end by a vertical leg portion thereof and on another end by a vertical support integrally formed with said second chassis, said L-shaped arm member being arranged so as to prevent contact of said second chassis with said rotary head drum and said plurality of tape guides during motion of said second chassis, said arm member being disposed over said rotary head drum and said tape guides when said apparatus is in the tape loading position, said arm member including a body portion connected to said leg portion and said vertical support and having a width which is larger than a corresponding width of said leg portion and said vertical support, and said arm member enhancing rigidity of said recess of said second chassis and supporting a flexible circuit board;

a pair of opposed sensor means for detecting a magnetic tape cassette and including a cable mounted on said arm member and connected to said pair of sensor means, wherein when said apparatus is in the tape loading position said vertical leg portion and said vertical support are vertically disposed on a straight line drawn between said pair of sensor means; and a protector plate formed of one of a metal or synthetic resin for protecting said rotary head drum and said tape guides, said protector plate having a first end supported on said bottom wall of said second chassis, a second end supported on said arm member, and a vertically extending intermediate portion between said first end and said second end, said second end of said protector plate lying in a plane parallel to said bottom wall of said second chassis and said intermediate portion being substantially perpendicular to said bottom wall of second chassis.

7. A cassette loading mechanism used in a recording and/or reproducing apparatus for loading a tape cassette which stores a magnetic tape, comprising:

a stationary chassis supporting a rotary head drum thereon, which said rotary head is in a tilted orientation toward said stationary chassis;

a movable chassis disposed movably with respect to said stationary chassis and supporting the tape cassette, said movable chassis being movable between an unloading position where the magnetic tape is unloaded from said rotary head drum, and a loading position where the magnetic tape is loaded on said rotary head drum;

a recessed portion formed in said movable chassis in which said rotary head drum is received when said movable chassis is in said loading position;

means for reinforcing said recessed portion, which means includes an arm member disposed over said recessed portion, which arm member provides a groove formed in said arm member which receives a portion of said rotary head drum when said movable chassis is in said loading position;

sensor means for detecting the magnetic tape cassette when said movable chassis shifts into said loading position, said sensor means comprising a pair of photosensors each of which includes a light source and a photo-sensitive member responsive to light emitted from said light source, which said light source is disposed on said movable chassis and wire for said photosensors is disposed on said reinforcing means a flexible circuit board secured to said reinforcing means and electrically connected to said sensor means.

8. A cassette loading mechanism as claimed in claim 7, wherein said groove is of a generally sectoral shape.

9. A cassette loading mechanism as claimed in claim 8, wherein said arm member comprises a body portion connected with said leg portion and said vertical support, and having a width which is larger than a corresponding width of said leg portion and said vertical support.

10. A cassette loading mechanism used in a recording and/or reproducing apparatus for loading a tape cassette which stores a magnetic tape, comprising:

a stationary chassis supporting a rotary head drum thereon;

a movable chassis disposed movably with respect to said stationary chassis and supporting the tape cassette, said movable chassis being movable between an unloading position where the magnetic tape is unloaded from said rotary head drum, and a loading position where the magnetic tape is loaded on said rotary head drum;

a recessed portion formed in a bottom wall of said movable chassis in which said rotary head drum is received when said movable chassis is in said loading position;

means fixed on said movable chassis for reinforcing said recessed portion;

sensor means for detecting the magnetic tape cassette when said movable chassis shifts into said loading position;

a flexible circuit board secured to said reinforcing means and electrically connected to said sensor; and a protector plate formed of a metal or synthetic resin for protecting said rotary head drum and said tape guides, said protector plate having a first end secured to and supported on said bottom wall of said movable chassis, a second end secured to said reinforcing means, and a vertically extending intermediate portion between said first end and said second end, said second end lying in a plane parallel to said bottom wall of said movable chassis and said intermediate portion being substantially perpendicular to said bottom wall of said movable chassis.

* * * * *